US008533440B2

(12) United States Patent
Levanoni et al.

(10) Patent No.: US 8,533,440 B2
(45) Date of Patent: Sep. 10, 2013

(54) ACCELERATING PARALLEL TRANSACTIONS USING CACHE RESIDENT TRANSACTIONS (75) Inventors: Yosseff Levanoni, Redmond, WA (US);
David L. Detlefs, Issaquah, WA (US);
Jan S. Gray, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 12/638,214

(22) Filed: Dec. 15, 2009

(65) Prior Publication Data
US 2011/0145553 A1 Jun. 16, 2011

(51) Int. Cl.
*G06F 12/00* (2006.01)

(52) U.S. Cl.
USPC .......................................................... 712/229

(58) Field of Classification Search
None
See application file for complete search history.

(56) References Cited

U.S. PATENT DOCUMENTS

| | | | |
|---|---|---|---|
| 4,442,487 A | 4/1984 | Fletcher | |
| 5,394,555 A | 2/1995 | Hunter | |
| 5,404,555 A | 4/1995 | Liu | |
| 5,428,761 A | 6/1995 | Herlihy et al. | |
| 5,768,500 A | 6/1998 | Agrawal | |
| 5,835,764 A | 11/1998 | Platt | |
| 6,314,563 B1 | 11/2001 | Agensen | |
| 6,665,704 B1 | 12/2003 | Singh | |
| 6,751,617 B1 | 6/2004 | Anfindsen | |
| 6,842,830 B2 | 1/2005 | Khare | |
| 6,845,430 B2 | 1/2005 | Hopeman | |
| 6,862,635 B1 | 3/2005 | Alverson | |
| 6,871,264 B2 | 3/2005 | Soltis | |
| 6,898,609 B2 | 5/2005 | Kerwin | |
| 6,938,128 B1 | 8/2005 | Kuskin et al. | |
| 6,976,155 B2 | 12/2005 | Drysdale | |
| 7,111,294 B2 | 9/2006 | Steensgaard | |
| 7,127,561 B2 | 10/2006 | Hill | |
| 7,162,512 B1 | 1/2007 | Amit | |
| 7,181,578 B1 | 2/2007 | Guha | |
| 7,210,145 B2 | 4/2007 | Srinivasan | |
| 7,213,106 B1 | 5/2007 | Koster | |
| 7,246,123 B2 | 7/2007 | Carr | |
| 7,284,091 B2 | 10/2007 | Chow et al. | |
| 7,320,065 B2 | 1/2008 | Gosior | |
| 7,343,476 B2 * | 3/2008 | Floyd et al. | ................... 712/216 |
| 7,376,800 B1 | 5/2008 | Choquette | |
| 7,395,382 B1 | 7/2008 | Moir | |
| 7,406,698 B2 | 7/2008 | Richardson | |
| 7,467,323 B2 | 12/2008 | Fields | |
| 7,478,210 B2 | 1/2009 | Saha | |
| 7,502,897 B2 | 3/2009 | Hertzberg | |

(Continued)

OTHER PUBLICATIONS

Notice of Allowance dated Nov. 29, 2012 cited in U.S. Appl. No. 12/638,929.

(Continued)

*Primary Examiner* — Eric Coleman
(74) *Attorney, Agent, or Firm* — Workman Nydegger (57) ABSTRACT

Handling parallelism in transactions. A method includes beginning a cache resident transaction. The method further includes encountering a nested structured parallelism construct within the cache resident transaction. A determination is made as to whether the transaction would run faster serially in cache resident mode or faster parallel in software transactional memory mode for the overall transaction. In the software transactional memory mode, cache resident mode is used for one or more hierarchically lower nested transactions. The method further includes continuing the transaction in the mode determined.

20 Claims, 3 Drawing Sheets

(56) References Cited

U.S. PATENT DOCUMENTS

| | | | |
|---|---|---|---|
| 7,512,636 | B2 | 3/2009 | Verma |
| 7,584,232 | B2 | 9/2009 | Guo |
| 7,711,909 | B1 | 5/2010 | Lev et al. |
| 7,856,537 | B2* | 12/2010 | Kumar et al. ............... 711/152 |
| 7,860,847 | B2* | 12/2010 | Detlefs et al. ............... 707/703 |
| 8,095,824 | B2 | 1/2012 | Gray |
| 8,229,907 | B2* | 7/2012 | Gray et al. ............... 707/703 |
| 2003/0055807 | A1 | 3/2003 | Lomet |
| 2003/0145136 | A1 | 7/2003 | Tierney et al. |
| 2003/0188300 | A1 | 10/2003 | Patrudu |
| 2004/0243868 | A1 | 12/2004 | Toll et al. |
| 2005/0060495 | A1 | 3/2005 | Pistoulet |
| 2005/0246487 | A1 | 11/2005 | Ergan |
| 2006/0085591 | A1 | 4/2006 | Kumar |
| 2007/0143287 | A1 | 6/2007 | Adl-Tabatabai |
| 2007/0143741 | A1 | 6/2007 | Harris |
| 2007/0156780 | A1 | 7/2007 | Saha |
| 2007/0156994 | A1 | 7/2007 | Akkary |
| 2007/0186056 | A1* | 8/2007 | Saha et al. ............... 711/144 |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 | 2/2008 | Gray |
| 2008/0127035 | A1 | 5/2008 | Lev |
| 2008/0162886 | A1 | 7/2008 | Saha |
| 2008/0163220 | A1 | 7/2008 | Wang |
| 2008/0270745 | A1 | 10/2008 | Saha |
| 2009/0006407 | A1 | 1/2009 | Magruder |
| 2009/0006467 | A1 | 1/2009 | Visscher |
| 2009/0006751 | A1 | 1/2009 | Taillefer |
| 2009/0006767 | A1 | 1/2009 | Saha |
| 2009/0007119 | A1 | 1/2009 | Blumrich |
| 2009/0019231 | A1 | 1/2009 | Cypher |
| 2009/0031310 | A1 | 1/2009 | Lev |
| 2009/0063780 | A1 | 3/2009 | Terechko |
| 2009/0070774 | A1 | 3/2009 | Raikin et al. |
| 2009/0089520 | A1 | 4/2009 | Saha |
| 2009/0113443 | A1 | 4/2009 | Heller |
| 2009/0165006 | A1 | 6/2009 | Ceze |
| 2009/0172292 | A1 | 7/2009 | Saha |
| 2009/0172303 | A1 | 7/2009 | Welc |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0182956 | A1 | 7/2009 | Caprioli et al. |
| 2009/0204969 | A1 | 8/2009 | Abadi |
| 2009/0235237 | A1* | 9/2009 | Song et al. ............... 717/132 |
| 2009/0235262 | A1 | 9/2009 | Ceze et al. |
| 2009/0260011 | A1 | 10/2009 | Snover |
| 2009/0282386 | A1* | 11/2009 | Moir et al. ............... 717/106 |
| 2010/0131953 | A1 | 5/2010 | Dice |
| 2010/0138841 | A1 | 6/2010 | Dice et al. |
| 2010/0162249 | A1 | 6/2010 | Shpeisman |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0229043 | A1 | 9/2010 | Saha |
| 2010/0325630 | A1 | 12/2010 | Flood |
| 2010/0332538 | A1 | 12/2010 | Gray |
| 2010/0332716 | A1 | 12/2010 | Sheaffer |
| 2010/0332721 | A1 | 12/2010 | Yamada |
| 2010/0332753 | A1 | 12/2010 | Gray |
| 2010/0332768 | A1 | 12/2010 | Gray |
| 2010/0332771 | A1 | 12/2010 | Gray |
| 2010/0332807 | A1 | 12/2010 | Sheaffer |
| 2010/0332808 | A1 | 12/2010 | Adl-Tabatabai |
| 2011/0145304 | A1 | 6/2011 | Gray |
| 2011/0145498 | A1 | 6/2011 | Taillefer |
| 2011/0145802 | A1 | 6/2011 | Levanoni |
| 2012/0179877 | A1 | 7/2012 | Shriraman et al. |
| 2012/0284485 | A1 | 11/2012 | Yamada |

OTHER PUBLICATIONS

Harris et al., "Abstract Nested Transactions", Aug. 2007 CiteSeerX, http://citeseer.ist.psu.edu/viewdoc/summary?doi=10.1.1.126.3885, pp. 1-10.

Office Action dated Dec. 7, 2012 cited in U.S. Appl. No. 12/638,103.

Office Action dated Apr. 4, 2012 cited in U.S. Appl. No. 12/638,929.

Office Action dated Oct. 5, 2012 cited in U.S. Appl. No. 12/493,167.

Ananian; "Unbounded Transactional Memory"; 2009; pp. 1-12; http://supertech.csail.mit.edu/papers/xaction.ps.

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1-12; http://www.cs.wisc.edu/multifacet/papers/asplos06_nested_logtm.pdf.

Carlstrom; "The ATOMOΣ Transactional Programming Language"; Jun. 11-16, 2006; pp. 1-13; http://tcc.stanford.edu/publications/tcc_pldi2006.pdf.

Moss; "Open Nested Transactions"; Semantics and Support; 2006; pp. 1-8; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Chong; "Scalable HMM based Inference Engine in LVCSR"; Mar. 31, 2009; 1 page; http://www.icsi.berkeley.edu/cgi-bin/events/event.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

Bracy; "Disintermediated Active Communication"—Nov. 9, 2006—pp. 1-4—http://ieeexplore.ieee.org/stamp/stamp.jsp?arnumber=04069172.

Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.

Andrew; "A Dictionary of HTML META Tags"—Feb. 11, 2007—pp. 1-11—http://vancouver-webpages.com/META/metatags.detail.html.

Spear; "Implementing and Exploiting Inevitability in Software Transactional Memory"—2008—pp. 59-66—http://ieeexplore.ieee.org/stamp/stamp.jsp?arnumber=04625833.

Author Unknown; Wikipedia; "Software Transactional Memory"—May 7, 2009—pp. 1-7—http://en.wikipedia.org/wiki/Software_transactional_memory.

Zilles et al. "Extending Hardware Transactional Memory to Support Non-busy Waiting and Non-transactional Actions," Nov. 2006, pp. 1-10.

Joao; "Flexible Reference-Counting-Based Hardware Acceleration for Garbage Collection"—Published Jun. 20-24, 2009 pp. 1-11.

Grossman; "The Transactional Memory/Garbage Collection Analogy"—Published Oct. 21-25, 2007—pp. 1-12.

Adl-Tabatabai; "Unlocking Concurrency"—Published Dec./Jan. 2006-2007 pp. 25-33.

Carlstrom; "Executing Java Programs with Transactional Memory"—Published Mar. 26, 2007 pp. 1-32.

Diestelhorst—"Hardware Acceleration for lock-free data structures and software-transactional memory"—Published Aug. 14, 2008 pp. 1-8.

Harizopoulos—"Steps towards cache-resident transaction processing"—Published 2004 pp. 1-12.

Lie—"Hardware Support for Unbounded Transactional Memory"—Published May 7, 2004 pp. 1-111.

Saha—"Architectural Support for Software Transactional Memory"—Published 2006 pp. 1-12.

Bobba—"Performance Pathologies in Hardware Transactional Memory"—Published 2007; pp. 1-11.

Author Unknown—"Hw-breakpoint: shared debugging registers"—Published Sep. 16, 2009; pp. 1-3.

Scherer—"Contention Management in Dynamic Software Transactional Memory"—Published Apr. 2004; pp. 1-10.

Curnow—"An Embedded Processor Architecture with Extensive Support for SoC Debug"—Retrieved Jun. 11, 2010; pp. 1-5.

U.S. Appl. No. 12/495,582, Oct. 4, 2011, Office Action.
U.S. Appl. No. 12/493,163, Nov. 28, 2011, Notice of Allowance.
U.S. Appl. No. 12/493,165, Dec. 12, 2011, Office Action.
U.S. Appl. No. 12/493,167, Jan. 20, 2012, Office Action.
U.S. Appl. No. 12/493,164, Feb. 3, 2012, Office Action.
Office Action dated Mar. 29, 2012 cited in U.S. Appl. No. 12/493,168.
Office Action dated Mar. 16, 2012 cited in U.S. Appl. No. 12/493,162.
Notice of Allowance dated Feb. 21, 2012 cited in U.S. Appl. No. 12/493,161.
Notice of Allowance dated Mar. 14, 2012 cited in U.S. Appl. No. 12/495,582.
Notice of Allowance dated Apr. 9, 2012 cited in U.S. Appl. No. 12/493,161.
Office Action dated Oct. 24, 2012 cited in U.S. Appl. No. 12/493,162.
Notice of Allowance dated Sep. 13, 2012 cited in U.S. Appl. No. 12/493,168.
Notice of Allowance dated Sep. 24, 2012 cited in U.S. Appl. No. 12/493,165.
Volos—"NePaLTM: Design and Implementation of Nested Parallelism for Transactional Memory"—Published 2009 http://www.adamwelc.org/papers/ecoop09.pdf; pp. 1-25.
Rothermel—"Concurrency Control Issues in Nested Transactions"—Published 1992 http://www.vldb.org/journal/VLDBJ2/P039.pdf; pp. 1-36.
Author Unknown—".NET Framework 4 Beta 1 enabled to use Software Transactional Memory (STM.NET Version 1.0)"—Published Jul. 24, 2009; pp. 1-84.
Nyte—"Nesting Models in Software Transactional Memory"—Published Sep. 14, 2007 Memory@Everything2.com; pp. 1-3.
Agrawal—"Nested parallelism in transactional memory"—Published 2008 http://portal.acm.org/citation.cfm?id=1345232&coll=GUIDE&dl=GUIDE&CFID=4659097&CFTOKEN=55342715&ret=1#Fulltext; pp. 163-174.
Office Action dated Aug. 20, 2012 cited in U.S. Appl. No. 12/638,929.
Office Action dated Aug. 16, 2012 cited in U.S. Appl. No. 12/493,164.
U.S. Appl. No. 13/554,558, May 1, 2013, Office Action.
U.S. Appl. No. 13/845,467, filed Mar. 18, 2013, Gray.
Notice of Allowance dated Mar. 20, 2013 cited in U.S. Appl. No. 12/493,167.
Notice of Allowance dated Jun. 24, 2013 cited in U.S. Appl. No. 12/638,103.
Office Action dated Jul. 17, 2013 cited in U.S. Appl. No. 12/638,345.

* cited by examiner

ACCELERATING PARALLEL TRANSACTIONS USING CACHE RESIDENT TRANSACTIONS

The inventions disclosed in this application were developed under a joint research agreement between Microsoft Corporation of Redmond, Wash. and Intel Corporation of Santa Clara, Calif.

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations where for a given set of operations, either all of the operations should be performed or none of the operations are performed. The set of operations that should all be performed or not performed may sometimes be referred to as an atomic block of operations. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations.

Transactions may be used as a mechanism for isolating concurrent activities when these activities need to access shared data. Concurrent activities are introduced using structured or unstructured parallelism. In a world where both transactions and concurrency injection primitives abound, it is desirable to provide two-way composition between these two mechanisms, in an efficient manner. For example, here is an example where transactions are used inside a structured parallelism construct:

```
parallel_for(int i, 0, 100)
{
    atomic {
        a[i] = i;
        SomeOtherAction(i);
    }
}
```

This direction of composition (atomic blocks inside a parallel construct) poses no problems to existing software and hardware transactions as each transaction by itself is single-threaded. However, notice what happens when the composition direction is reversed:

```
atomic {
    parallel_for(int i, 0, 100)
    {
        a[i] = i;
        SomeOtherAction(i);
    }
}
```

In this case the program asserts it would like to have a multi-thread-transaction. That is, it would like the transaction to encompass and isolate 100 internal parallel activities. They should be isolated from any code executing outside of the transaction (using the level of isolation the system normally provides for transactions) but internally they are free to synchronize using other means, or not synchronize at all, subject to the restrictions of a memory model that is defined for such composition scenarios.

Furthermore, each branch of parallelism internal to the enclosing transaction may introduce its own nested transactions:

```
atomic {
    parallel_for(int i, 0, 100)
    {
        atomic {
            a[i] = i;
        }
    }
}
```

Each of the nested transactions is logically and perhaps physically concurrent with other nested transactions and they are all children of the top level transaction. These transactions are closed nested parallel transactions (closed nested with respect to the parent and parallel with respect to sibling transactions). The computation expressed by parallel transactions can be thought of as a tree with arbitrary levels of nesting and span.

As alluded to above, transactional computing can be implemented, in some systems, using specialized hardware that supports transactional memory. Some of these systems are often referred to as cache resident transaction system inasmuch as these use the core-level data cache of an architecture to accomplish the transactional computing. In systems where hardware does not support hardware assisted transaction computing, transactional computing can be performed by using software techniques. Software locks can be taken on data to protect the data. Additionally shadow copies or undo records can be stored to facilitate rolling back aborted transactions.

Cache resident transactions are typically not readily suitable to accelerate parallel transactions of any sort inasmuch as the acceleration is provided by leveraging the core-level cache as a unit of isolation. The architecture exposed to software does not allow sharing of this unit of isolation between two executing hardware threads, even if this is done physically at the cache level unbeknownst to the software.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a computing environment including a hardware assisted transaction system. The method includes acts for handling parallelism in transactions. The method includes beginning a cache resident transaction. The method further includes encountering a nested structured parallelism construct within the cache resident transaction. A determination is made as to whether the transaction would run faster serially in cache resident mode or faster parallel in software transactional memory mode for the overall transaction. In the software transactional memory mode, cache resident mode is used for one or more hierarchically lower nested transactions. The method further includes continuing the transaction in the mode determined.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may include functionality for taking advantage of cache resident (CR) transactions even with parallelism. This is done using a two-pronged approach. First, parallelism is introduced more selectively, when it would likely increase overall system's throughput. Second, cache resident transactions are used to accelerate the execution of leaf transactions, that is, those transactions which do not happen to have any additional physical nested parallelism in them.

Figure 1A:
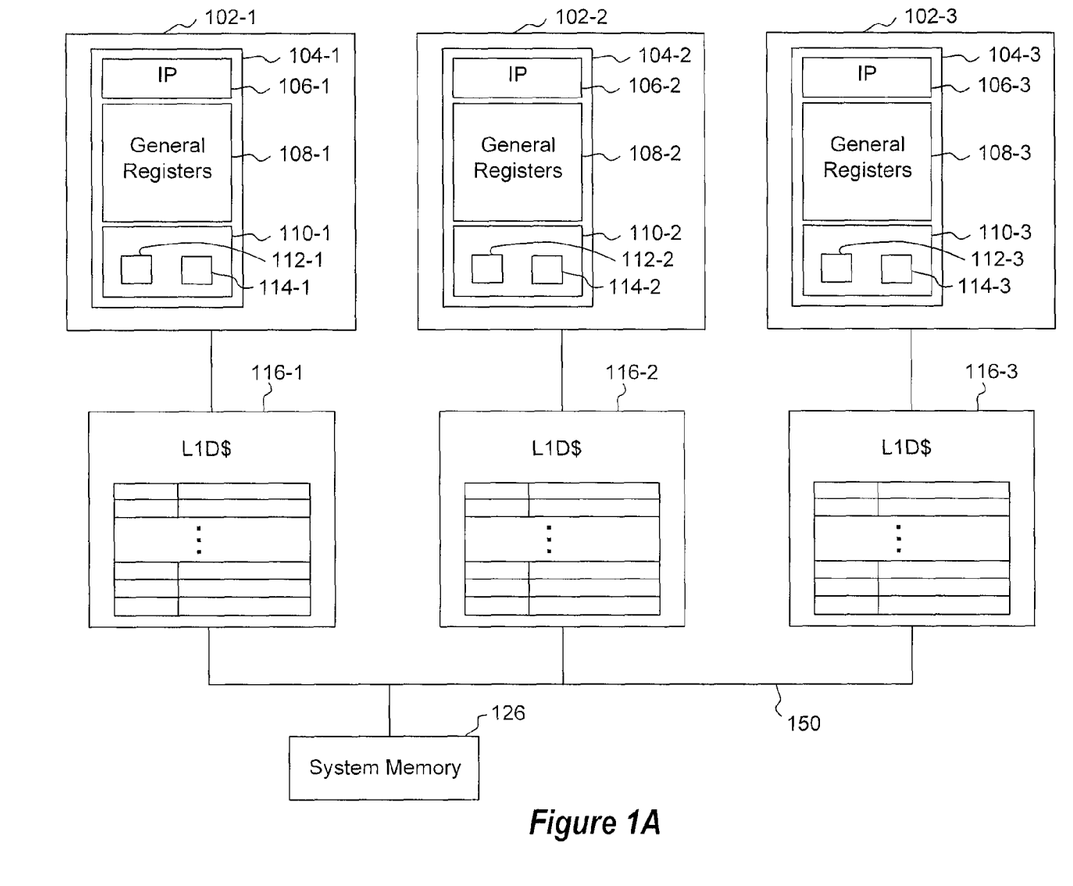
FIG. 1A illustrates a cache hierarchy.

The following now illustrates a general discussion of a hardware transactional system that may be used to implement some embodiments. Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Figure 1B:
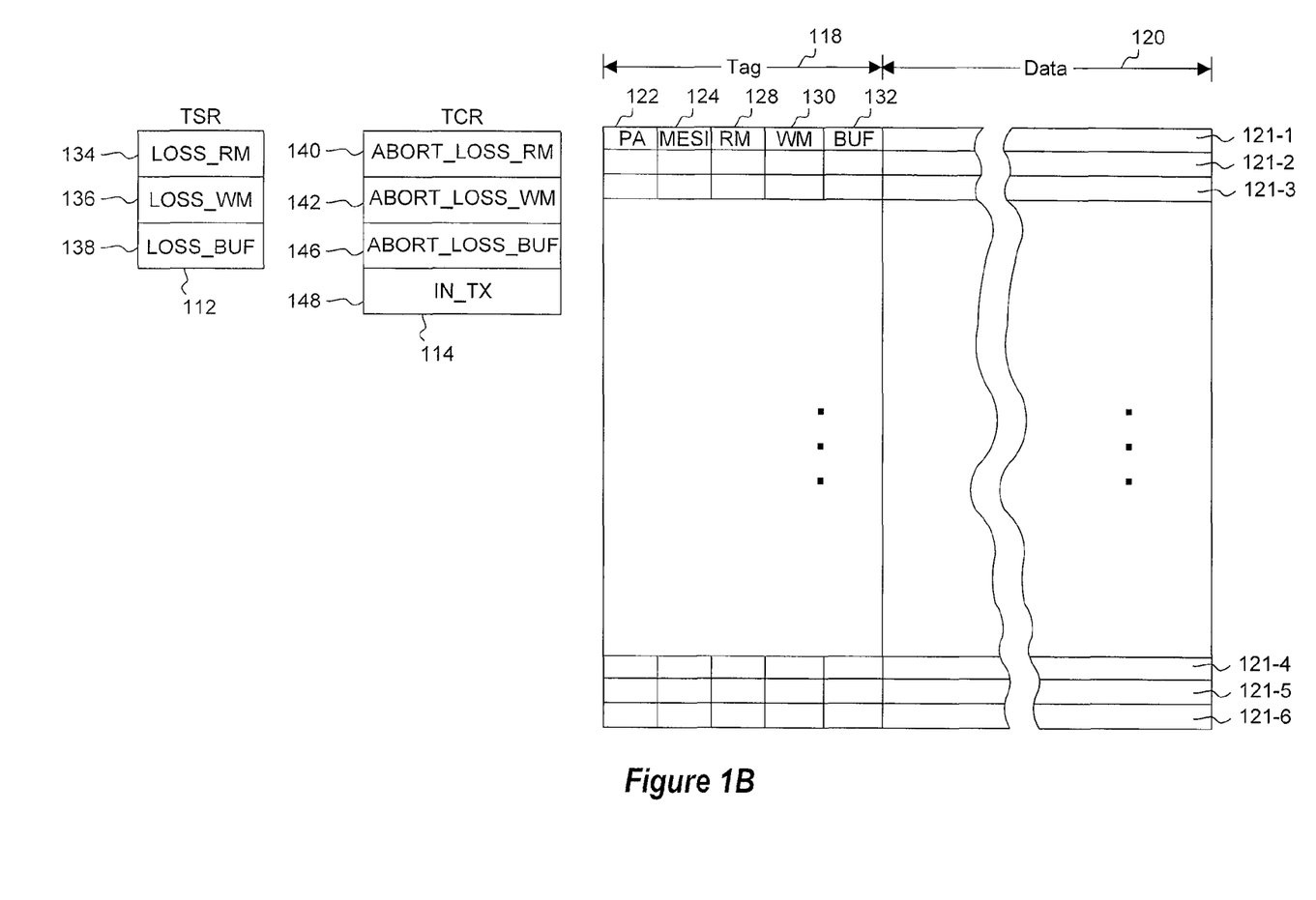
FIG. 1B illustrates details of a data cache with monitoring enabled.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

Software transactional memory is typically implemented using two fundamental building blocks. The first is a special lock used by the transactional memory (TM) system to achieve isolation between concurrent activities. It is referred to as a Transactional Memory Word (TMW). TMW's typically provide read and/or write access to a shared memory resource, and typically support pessimistic and/or optimistic concurrency control. The second concept is that of shadow copies or undo records. When shadow copies are used, a transaction wishing to update an object would instead create a shadow copy backing the object and apply its changes to the shadow copy. Only when and if the transaction commits does it copy the contents of the shadow copy onto the object. When undo records are used, a transaction logs the previous contents of an object before modifying it. If the transaction needs to roll back, it undoes its changes by copying the contents of undo records back into the objects that they originated from. Novel embodiments described herein, as will be described in more detail later herein, can work with either shadow copies or undo records.

To support parallel nested transactions new, recursive, layers of isolation are created and adhered to. When considering top-level transactions, a mapping between objects and locks is identified. Each top level transaction acquires the lock mapped to an object before the object can be accessed. When considering parallel nested transactions, an additional mapping between objects and locks is introduced at each transactional nesting level. To access an object, all locks in the hierarchy of the current transaction are taken. The following illustrates an example:

```
// Global scope. Lock mapping global lock manager (GLM) introduced at
global level
parallel {
    atomic { // Tx1. Lock mapping LM1 introduced at this level
        parallel {
            atomic { x++; } // Tx1.1
            atomic { x++; } // Tx1.2
        }
    }
    atomic { // Tx2. Lock mapping LM2 introduced at this level
        parallel {
            atomic { x++; } // Tx2.1
            atomic { x++; } // Tx2.2
        }
    }
}
```

Consider transaction Tx2.1 and the set of locks it acquires to update the variable 'x'. First, it ensures that Tx2, its immediate parent, has acquired the lock assigned to 'x' by the global mapping GLM such that concurrent transactions, such as Tx1, and their children, are prevented from accessing it simultaneously. The fact that GLM('x') has been acquired is recorded at the Tx2 level, even though it has been done by a child. It has been done by the thread executing Tx2.1 on behalf of its parent, Tx2.

At this point both Tx2.1 and Tx2.2 are free to access the variable 'x'. Thus, further protection is needed to arbitrate access to the field by these transactions. This is achieved using the lock mapping introduced by Tx2, namely LM2. Tx2.1 proceeds to acquire the lock assigned to 'x' by LM2. At that point the entire hierarchy has been traversed and Tx2.1 has ensured that it has exclusive access to the variable.

When Tx2.1 commits, it relinquishes the locks that it has acquired for itself but the locks that it has acquired on behalf of Tx2 are maintained until Tx2 after Tx2 has committed.

The following now illustrates implementation of sequential nested transactions in software. The above scheme works for the case where there is no nested parallelism inside a transaction but this may be wasteful as the nested locks are not required inasmuch as there are no concurrent activities to synchronize against within the transactions. Thus sequential nested transactions only need to guarantee that if they rollback the state, changes that they have applied are reverted, but they do not need to introduce their own layers of locks, inasmuch as sibling sequential concurrent transactions are never concurrent.

The following now introduces concepts related to cache resident (CR), or hardware assisted transactions. In particular, attention is given to software lock respecting CR transactions vs. CR transactions that are not software-lock respecting. Two modes for executing hardware transactions are now examined. The first is non-lock-respecting CR transactions. In particular, CR transactions are not required to respect software locks. In this mode, only same kind transactions may be in progress and they all depend on hardware isolation. No software locks are used. This is the most efficient acceleration mode as the underlying user code does not have to be instrumented to consult software locks. However, whenever one or more transactions need to overflow to software transactional memory (STM) execution mode, all other CR transactions respect the locks taken by the software transaction, and they also make their changes visible to the software transaction. Thus lock-respecting transactions are slower than non-lock-respecting transactions, but they are still faster than pure STM transactions. To represent these different types of transactions, two acronyms are used herein: CRLR: cache-resident lock respecting transaction; and CRNLR: cache-resident non-lock respecting transaction.

Potentially unmonitored and buffered moves (PUMOV) and explicitly unmonitored and buffered moves (MOVXU) will now be discussed. Specialized instructions may be included in an instruction set architecture (ISA) for hardware which allow instructions that allow "peeking" and "poking" into memory in a manner that does not make the access a part of the read or write set of the current transaction. This mechanism can be used to inspect global data structures while executing cache-resident transactions without dooming said transactions due to contention.

Thus, it may be desirable to run code first in CRNLR mode, then fall back to CRLR mode and only then fall back into pure STM mode, while utilizing all system resources.

Embodiments may include functionality for transforming parallel nested transactions into sequential nested transactions. For example, parallel transactions can be run serially on a single core or thread. Embodiments may be implemented to introduce additional parallelism when it is judged that it would increase overall system's throughput. For example, if a system has available processor cores to perform work, then it may make sense to try and introduce parallelism by introducing new threads. However, if all processors cores are saturated with work, then there may be no advantage to introducing parallelism, but rather executing the transactions serially on a single thread may be sufficient.

For this purpose the computation is divided into chores and those chores may introduce other parallel chores. The chores are deposited into work queues and worker threads from a thread pool remove those items from the queue. When chores need to block the thread that executes them notifies the system that it may be beneficial to inject additional worker threads. In such a system it is easy and cheap to determine whether there is enough work to make all hardware threads busy by examining whether the work queues are empty or not. If they are not close to being empty, then it makes more sense to inline additional chores, i.e., execute them synchronously on the same thread that requested their execution, instead of queuing them for asynchronous execution.

To illustrate this principle consider the following sketch implementation of the for all primitive, that takes a start index, end index and a function pointer to invoke for each index in the range [start, end).

```
for_all(int begin, int end, void (f*)(int)) {
    Bag async_tasks = new Bag( );
    for (int i=begin; i<end; i++) {
        if (are_work_queues_saturated( )) {
            // Execute serially
            f(i);
        }
        Else {
            Schedule async chore for execution of 'f(i)'
            Add chore handle to async_tasks;
        }
    }
    Wait until all async_tasks have completed
}
```

Depending on the relative cost of are_work_queues_saturated compared with the cost of a typical work item, embodiments may decide whether to execute synchronously or asynchronously apply to a batch of indices, rather than just one at a time.

Considering again the case where the for_all primitive appears inside an atomic block that is being executed as a CRNLR transaction, it may be beneficial to apply the above transformation, even more aggressively, since as long as chores are executed synchronously, the transaction and the whole system can remain in the CRNLR mode. The changes that applied to the above algorithm are the following:

(1) Inspection of the work load in the work queues is done using specialized instructions included in an instruction set architecture (ISA) for hardware which allow instructions that allow "peeking" and "poking" into memory in a manner that does not make the access a part of the read or write set of the current transaction (such as the PUMOV and MOVXU instructions described above), otherwise transactions will be doomed due to changes to this frequently mutated data structure.

(2) In case it is decided that parallelism is indeed beneficial embodiments may doom the CRNLR and re-execute the transaction as a parallel transaction in software mode. This is illustrated below:

```
for_all_in_CRNLR(int begin, int end, void (f*)(int)) {
    for (int i=begin; i<end; i++) {
        if (are_work_queues_saturated_in_CRNLR( )) { //
implemented with PUMOVs or MOVXUs
            // Execute serially
            f(i);
        }
        Else {
            Rollback_CRNLR_and_rexece_in_STM( );
        }
    }
}
```

More elaborate or alternative policies for deciding when to abandon serial execution in CRNLR mode and switch to true parallelism in software mode are possible. For example, it is possible to take into account the amount of work that has already been completed in serial mode as this work will have to be undone when switching to software mode. Thus, if the work remaining is much less then the work done, then it makes sense to continue the work serially till the completion of all iterations. As another example, if the number of iterations is high, which is likely to be the case with parallel_for, then it makes sense to switch to software mode immediately, as the chances of completing the entire parallel workload in the CR transactions are small, inasmuch as it is likely to overflow the cache.

Attention is now directed to embodiments which include functionality for accelerating software-based parallel transactions. As discussed above, each true parallel nested transaction introduces its own layer of locking and shadow copies and/or undo records. Embodiments can therefore apply the degradation of CRNLR to CRLR to STM to each hierarchical level of the locking and shadow-copy/undo-records hierarchy. In particular, while a top level (i.e. parent) transaction may run in STM, lower level transactions may run in CRNLR and/or CRLR modes.

For example, referring back to the example above, reproduced here again for convenience:

```
parallel {
    atomic { // Tx1. Lock mapping LM1 introduced at this level
        parallel {
            atomic { x++; } // Tx1.1
            atomic { x++; } // Tx1.2
        }
    }
    atomic { // Tx2. Lock mapping LM2 introduced at this level
        parallel {
            atomic { x++; } // Tx2.1
            atomic { x++; } // Tx2.2
        }
    }
}
```

Transaction Tx2 can operate in a mode where it is lock-respecting, either as an STM transaction or as a CRLR transaction, with respect to its sibling Tx1 but where internally, that is for transactions nested in Tx1, it is using non-lock-respecting cache resident transactions. When this is the situation, the following steps are taken for Tx2.1 to access 'x':

1. Tx2.1 is a CRNLR transaction with respect to Tx2.2, but it's a lock-respecting transaction (CRLR) with respect to transactions that are not its siblings, in particular it respects and makes lock acquisitions visible to Tx1 and Tx1's children.
2. Therefore to modify 'x' Tx2.1 first executes the STM barrier on behalf of its parent, Tx2.
3. Then to provide isolation from Tx2.2, Tx2.1 establishes hardware monitoring and buffering on 'x'. i.e., conflicts between Tx2.1 and Tx2.2 are detected and resolved by the hardware.

Further attention is now given to step 2 above. Normally, the effects of a CRLR barrier are committed from both hardware and software perspective when the hardware transaction commits. In the case of Tx2.1 and its parent Tx2 however, when Tx2.1 commits, it needs to affect a global state change were instead of releasing the software lock on 'x' it has transmitted it to its parent, Tx2. The lock will be released only when Tx2 commits.

If the hardware supports suspending the hardware transaction then Tx2.1 can suspend the hardware transaction, acquire the software lock on behalf of Tx2 and change Tx2's logs in a durable manner to account for that.

If suspension of the hardware transaction is not supported by the hardware then Tx2.1 can do the same operations, but under the hardware transaction. This will increase the chances of a conflict due to siblings trying to do the same thing, and therefore it may be desirable to have hardware suspension such that these operations occur in a non-conflicting manner. Embodiments may first probe using specialized instructions included in an instruction set architecture for hardware which allow instructions that allow "peeking" and "poking" into memory in a manner that does not make the access a part of the read or write set of the current transaction (such as the PUMOV or MOVXU instructions described) whether Tx2 already has the lock it needs to have to access 'x' and only if the answer is "No", then proceed to acquire the Tx2 level lock as part of the nested hardware transaction. This will decrease the amount of contention between Tx2.1 and its siblings.

If all the children of Tx2 are executing in CRNLR mode with respect to Tx2 then once a software lock has been acquired on the Tx2 level, no further adherence to software locking is required—all conflicts internal to Tx2 are resolved at the hardware level when accessing the data using monitored and buffered accesses.

Embodiments have been described above which show how nested transactions can operate in lock-respecting mode with respect to their parent and the sibling of their parent and in a non-respecting mode with respect to their siblings. Similarly, these transactions operate on the data that is appropriate at their level. For example, suppose the system is based on shadow copies. When Tx2.1 wishes to access 'x' it performs two steps on behalf of its parent: (1) Acquire the lock assigned to 'x' by the GLM. (2) Create a shadow copy for at the Tx2 level.

Once these operations are done, Tx2.1 (and any siblings) proceeds by updating 'x' not in its master location but rather in the shadow copy assigned to it by Tx2. Any conflicts between Tx2.1 and siblings are detected by the hardware when the shadow copy is accessed in a conflicting manner. When undo-records are used, then the master data is accessed by hardware transactions, but using monitored and buffered accesses.

Consider now the case in which some child of Tx2 decides it needs to move to software mode. Such a transition forces all of its siblings to move a lock respecting mode, with respect to the Tx2 lock mapping: LM2. This is simply a recursive application of the CRNLR to CRLR to STM degradation that applies at the global level, to the nested transaction level. So for example, if Tx2.2 switched to lock-respecting mode, the following actions are taken by Tx2.1 to modify 'x'.

1. On behalf of Tx2:
    a. Acquire GLM('x')
    b. Create shadow copy for 'x' at the Tx2 level
2. Monitor/buffer the lock LM2('x') using a CRLR barrier
3. Modify 'x' at the Tx2 shadow copy level using, monitored and buffered writes.

When using the above two techniques parallel nested transactions benefit from the acceleration that is possible at their nesting level, while still obeying the isolation protocols of higher levels and leveraging all system resources.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
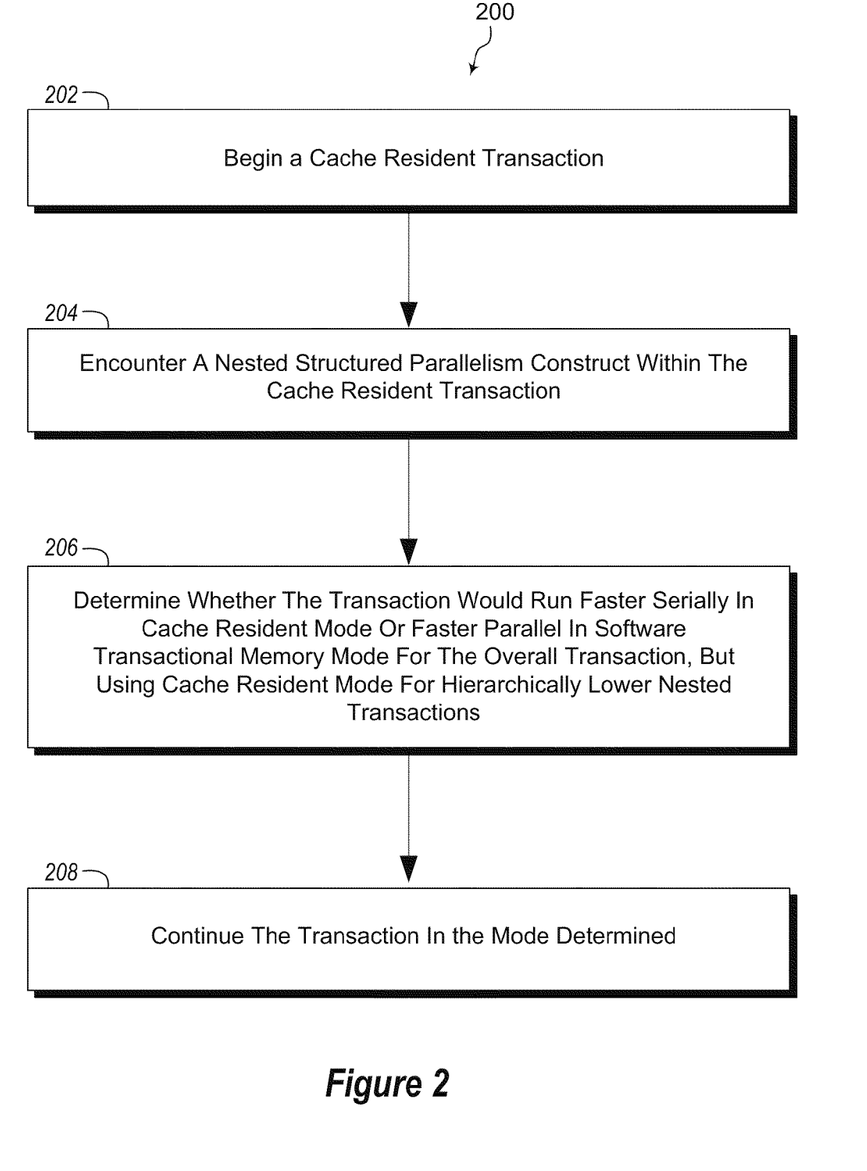
FIG. 2 illustrates a method of handling parallelism in transactional memory system.

Referring now to FIG. 2, a method 200 is illustrated. The method 200 may be practiced in a computing environment including a hardware assisted transaction system. The method includes acts for handling parallelism in transactions. The method includes beginning a cache resident transaction (act 204). The method further includes encountering a nested structured parallelism construct within the cache resident transaction (act 204). A determination is made as to whether the transaction would run faster serially in cache resident mode or faster parallel in software transactional memory mode for the overall transaction (act 206). In the software transactional memory mode, cache resident mode is used for one or more hierarchically lower nested transactions. For example as illustrated above, transaction Tx2 may nm in software transactional memory mode while transactions Tx2.1 and Tx2.2 begin running in cache resident modes. The method 200 further includes continuing the transaction in the mode determined.

The method 200 may be practiced where determining whether the transaction would run faster serially in cache resident mode or faster parallel in software transactional memory mode for the overall transaction includes determining that there is available capacity on processors and as a result, determining that the transaction would run faster parallel in software transactional memory mode for the overall transaction. Cache resident mode can still be used for one or more hierarchically lower nested transactions.

The method 200 may be practiced where determining whether the transaction would run faster serially in cache resident mode or faster parallel in software transactional memory mode for the overall transaction includes suspending transaction. This may be done for example by putting the hardware into a non transactional state or by using non-transactional instructions such as PUMOV and MOVXU discussed above.

The method 200 may be practiced where determining whether the transaction would run faster serially in cache resident mode or faster parallel in software transactional memory mode for the overall transaction comprises using one or more specialized instructions included in an instruction set architecture for hardware. The instructions including functionality for peeking and poking accesses into memory in a manner that does not make the accesses a part of the read or write set of the current transaction. The instructions can be used to inspect workload of work queues. Again, instructions such as PUMOV and MOVXU discussed above may be used.

The method 200 may be practiced where determining whether the transaction would nm faster serially in cache resident mode or faster parallel in software transactional memory mode for the overall transaction includes determining the amount of work that has already been completed in a serial mode. As noted, it may not be efficient to unwind a large amount of work that has already been done serially to introduce parallelism.

The method 200 may be practiced where determining whether the transaction would run faster serially in cache resident mode or faster parallel in software transactional memory mode for the overall transaction includes determining a number of iterations in the nested structured parallelism construct, and if the number of iterations meets or exceeds a predetermined threshold, then determining that the transaction would run faster parallel in software transactional memory mode for the overall transaction, but using cache resident mode for one or more hierarchically lower nested transactions. In particular, if there are a large number of iterations, than it might be likely that the cache would be overflowed if a cache resident serial mode were used.

The method 200 may further include switching a hierarchically lower nested transactions to a software transaction lock respecting mode, and as a result switching any sibling transactions, to the hierarchically lower nested transactions switched to a software transaction memory mode, to software lock respecting modes. For example, as illustrated above, when transaction Tx2.1 switches to a software lock respecting mode, then transaction Tx2.2 also switches to a software lock respecting mode. Software lock respecting modes may be cache-resident lock respecting modes or purely software transactional memory modes.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a hardware assisted transaction system, a method of handling parallelism in transactions, the method comprising:
    beginning a cache resident transaction;
    encountering a nested structured parallelism construct within the cache resident transaction;
    determining whether the transaction would run faster serially in cache resident mode or faster parallel in software transactional memory mode for the overall transaction, but using cache resident mode for one or more hierarchically lower nested transactions; and
    continuing the transaction in the mode determined.

2. The method of claim 1 wherein determining whether the transaction would run faster serially in cache resident mode or faster parallel in software transactional memory mode for the overall transaction comprises determining that there is available capacity on processors and as a result, determining that the transaction would run faster parallel in software transactional memory mode for the overall transaction, but using cache resident mode for one or more hierarchically lower nested transactions.

3. The method of claim 1 wherein determining whether the transaction would run faster serially in cache resident mode or faster parallel in software transactional memory mode for the overall transaction comprises suspending transaction.

4. The method of claim 1 wherein determining whether the transaction would run faster serially in cache resident mode or faster parallel in software transactional memory mode for the overall transaction comprises using one or more specialized instructions included in an instruction set architecture for hardware, the instructions including functionality for peeking and poking accesses into memory in a manner that does not make the accesses a part of the read or write set of the current transaction, to inspect workload of work queues.

5. The method of claim 1 wherein determining whether the transaction would run faster serially in cache resident mode or faster parallel in software transactional memory mode for the overall transaction comprises determining the amount of work that has already been completed in a serial mode.

6. The method of claim 1 wherein determining whether the transaction would run faster serially in cache resident mode or faster parallel in software transactional memory mode for the overall transaction comprises determining a number of iterations in the nested structured parallelism construct, and if the number of iterations meets or exceeds a predetermined threshold, then determining that the transaction would run faster parallel in software transactional memory mode for the overall transaction, but using cache resident mode for one or more hierarchically lower nested transactions.

7. The method of claim 1, further comprising switching a hierarchically lower nested transaction to a software lock respecting mode, and as a result switching any sibling transactions, to the hierarchically lower nested transactions switched to a software transaction memory mode, to a software lock respecting mode with respect to siblings of their parent, but at the same time a non-lock-respecting for their immediate siblings.

8. The method of claim 7, wherein the software lock respecting modes are cache-resident lock respecting.

9. The method of claim 7, wherein the software lock respecting modes are software transactional memory modes.

10. A physical storage media comprising computer executable instructions that when executed by one or more processors cause one or more of the processors to perform the following:
    beginning a cache resident transaction;
    encountering a nested structured parallelism construct within the cache resident transaction;
    determining whether the transaction would run faster serially in cache resident mode or faster parallel in software transactional memory mode for the overall transaction, but using cache resident mode for one or more hierarchically lower nested transactions; and
    continuing the transaction in the mode determined.

11. The physical storage media of claim 10 wherein determining whether the transaction would run faster serially in cache resident mode or faster parallel in software transactional memory mode for the overall transaction comprises determining that there is available capacity on processors and as a result, determining that the transaction would run faster parallel in software transactional memory mode for the overall transaction, but using cache resident mode for one or more hierarchically lower nested transactions.

12. The physical storage media of claim 10 wherein determining whether the transaction would run faster serially in cache resident mode or faster parallel in software transactional memory mode for the overall transaction comprises suspending transaction.

13. The physical storage media of claim 10 wherein determining whether the transaction would run faster serially in cache resident mode or faster parallel in software transactional memory mode for the overall transaction comprises using specialized instructions included in an instruction set architecture for hardware, the instructions including functionality for peeking and poking accesses into memory in a manner that does not make the accesses a part of the read or write set of the current transaction, to inspect workload of work queues.

14. The physical storage media of claim 10 wherein determining whether the transaction would run faster serially in cache resident mode or faster parallel in software transactional memory mode for the overall transaction comprises determining the amount of work that has already been completed in a serial mode.

15. The physical storage media of claim 10 wherein determining whether the transaction would run faster serially in cache resident mode or faster parallel in software transactional memory mode for the overall transaction comprises determining a number of iterations in the nested structured parallelism construct, and if the number of iterations meets or exceeds a predetermined threshold, then determining that the transaction would run faster parallel in software transactional memory mode for the overall transaction, but using cache resident mode for one or more hierarchically lower nested transactions.

16. The physical storage media of claim 10, further comprising computer executable instructions that when executed by one or more processors cause the processors to switch a hierarchically lower nested transactions to a software transaction memory mode, and as a result switch any sibling transactions, to the hierarchically lower nested transactions switched to a software transaction memory mode, to a software lock respecting mode with respect to siblings of their parent, but at the same time a non-lock-respecting for their immediate siblings.

17. The physical storage media of claim 16, wherein the software lock respecting modes are cache-resident lock respecting.

18. The physical storage media of claim 16, wherein the software lock respecting modes are software transactional memory modes.

19. A computer system comprising a plurality of processors and one or more computer readable memory having stored there on computer executable instructions that when executed by one or more of the processors causes the system to perform the following:

beginning a cache resident transaction;

encountering a nested structured parallelism construct within the cache resident transaction;

determining that the transaction would run faster parallel in software transactional memory mode for the overall transaction, using cache resident mode for one or more hierarchically lower nested transactions, by:

suspending the transaction;

using one or more specialized instructions included in an instruction set architecture for hardware, the instructions including functionality for peeking and poking accesses into memory in a manner that does not make the accesses a part of the read or write set of the current transaction, to inspect workload of work queues; and as a result, determining that there is available capacity on processors; and running the transaction in software transactional memory mode for the overall transaction, using cache resident mode for one or more hierarchically lower nested transactions.

20. The system of claim 19, wherein suspending the transaction is performed by using one or more specialized instructions.

\* \* \* \* \*